May 18, 1943. D. T. STARR 2,319,272

PATCHING MATERIALS FOR RUBBER GOODS

Filed Nov. 20, 1940

INVENTOR.
Delano T. Starr

Patented May 18, 1943

2,319,272

UNITED STATES PATENT OFFICE 2,319,272

PATCHING MATERIAL FOR RUBBER GOODS

Delano T. Starr, San Gabriel, Calif.

Application November 20, 1940, Serial No. 366,500

6 Claims. (Cl. 154—43)

This is a continuation-in-part of my co-pending application Serial No. 257,468, filed February 20, 1939.

My invention relates to improvements in patching materials for rubber goods and more particularly those patching materials made up of laminated live rubber construction and requiring an adhesive coating, for application, which needs for protection a protective covering intimately applied and which covering is adapted for removal before application of the patching material to the injured rubber goods.

To attain this object of my invention, which is to facilitate and improve a method for removal of such protective covering, my one aim is to provide a protective covering easily ripped or ruptured along lines which have been diminished in tensile strength, either before or after application to the patching materials, by suitably scoring, scorching, abrading, corroding or otherwise structurally changing the material used for the covering.

The removal of this covering, which usually is of considerable strength, is not easy to accomplish as at present provided. It is best effected by a ripping or rupture along a line parallelling the threads of the fabric and stripping off of one portion at a time; applying the cleared portion to the prepared repair and then completing the stripping action. If care is not taken contact by the fingers, hand or tool is had with the adhesive surface of the patching material and the adhesion to the repair is impaired.

By weakening the covering along a narrow zone or line the ripping or tearing along that line is more easily effected by exerted strains. Continued stretching of the rubber patch serves to loosen the adhesion causing the covering to progressively separate from the patching material making it easy to grasp the freed edges of the covering and to strip it from its adhesion with but little danger of smearing or otherwise impairing the effectiveness of the adhesion to the article undergoing repair.

In the accompanying drawing I illustrate the preferred embodiment of my invention in which identical numerals are applied to similar elements wherever the same may occur.

Figure 1:
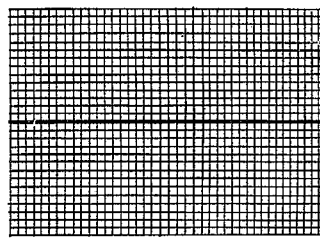
Figure 1 is a plan view of a patch made up of a sheet of prepared rubber and covered with a holland.
Figure 2:
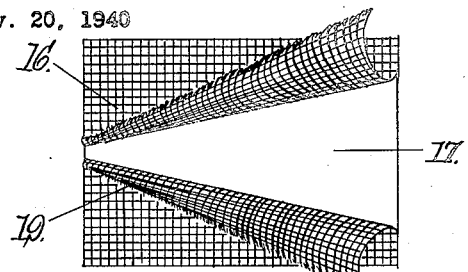
Figure 2 is a similarly placed view after the rupture of the holland.
Figure 3:
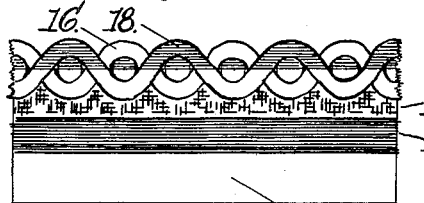
Figure 3 is an enlarged view of a fragment of such a patch.
Figure 4:
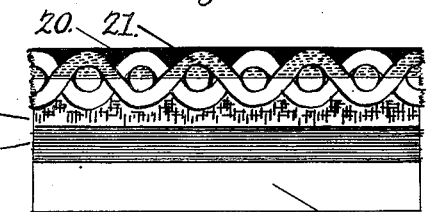
Figure 4 is a similar view illustrating an applied treatment for corroding a lineal portion of the holland.

Referring to the drawing in detail, the patch designated generally at 15 is shown in Figures 3 and 4 to embody the conventional construction which includes the bottom live rubber sheet 17, an intermediate live rubber sheet 14 and a top live rubber sheet 13, the sheets being secured together in superposed relation in any suitable manner, such as vulcanizing or adhesively attaching the same to form a laminated patch. However, the patch 15 may be constructed of a single sheet of live rubber in place of the laminations if desired.

The outer surface of the top sheet 13 is treated in the usual manner to produce an adhesive coating for rubber patching purposes and also capable of causing the adhesion to the patch of a protective temporary inelastic cover sheet 16, which may comprise the usual holland or similar treated fabric, or the cover sheet may comprise any other suitable flexible material or composition such as "Cellophane" or allied cellulose, collodion, pyroxylin or other substance in sheet form having an affinity for the adhesive on the patch.

The temporary protective cover sheet 16 is provided with a weakened portion indicated at 18 which preferably is in the form of a score line extending across the surface of the cover from edge to edge, the score line penetrating only partly through the thickness of the cover sheet to maintain the function of the same in excluding direct rays of light and air under normal conditions, as well as to prevent dirt and other foreign substances from contacting the adhesive surface of the patch, the weakened portion of the cover sheet facilitating the easy rupture of the cover sheet along the score line to provide the free edges 19.

Figure 5:
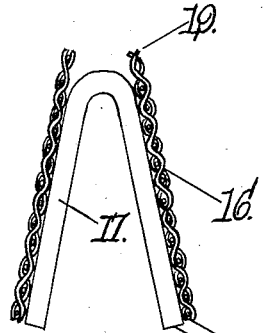
Figure 5 shows a favored method for rupturing the holland along the weakened line.

This rupturing of the cover sheet may be accomplished either by flexing the patch as shown in Figure 5 to cause a breaking of the material or by twisting the edge of the patch in a movement simulating tearing and then stretching the rubber patch material along lines at right angles to the score line and the rupture may also be made merely by exerting the stretching force and preferably initially subjecting such force to one end of the score line to start the rupture. After the rupture of the cover sheet along the score line, a progressive stretching action of the rubber patch will loosen the ruptured edges from the patch to an extent corresponding to the stretch imparted, so as to enable the ruptured edges to be gripped by the fingers of a person for completely removing the severed portions of the cover sheet without danger of touching the adhesive surface of the patch.

Figure 6:
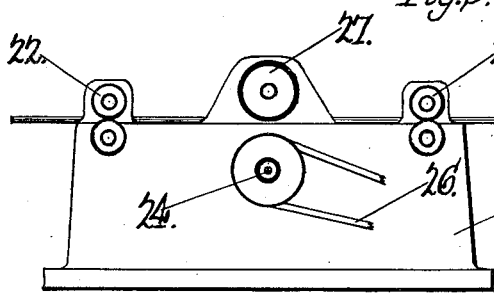
Figure 6 is an elevation.
Figure 7:
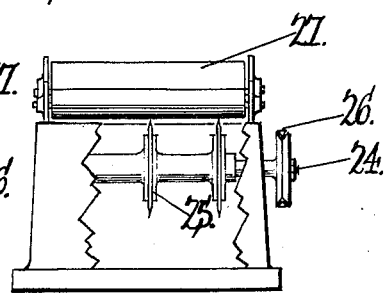
Figure 7 is an end view of a simple machine for properly applying the mutilating means to the holland.

It will be understood that the cover sheet may be scored either before or after applying to the rubber patch, and in Figures 6 and 7 I have illustrated a practical device for scoring the cover sheet, which comprises a train of feed rolls 22 mounted in side frames 23 which carry in suitable bearings the shaft 24 upon which is secured the abrading wheels 25, the shaft being driven by a belt 26 traveling over a pulley 26' keyed on the shaft, the belt being driven by a suitable source of power.

A pressure roll 27 serves to hold the cover sheet or patch material 16 against the weakening or scoring wheels 25.

Other methods of weakening the cover sheet along a predetermined line may also be employed, such as applying a chemically active corrosive weakening agent, acid or caustic, indicated at 20 in Figure 4 to partially destroy or dissolve the outer surface of the cover to the extent indicated by the dotted lines at 21.

The art affords numerous additional methods for weakening such a line suitably traversing the protective covering either before or after it has been applied to the patching materials. Among them I mention scoring designed to cut part way through the cover material as with a knife, or razor blade. It is also within my right to construct the cover with suitable lines of special weakness as by reducing the cross sectional area or the omission of threads of the warp or woof where the cover is constructed of fabric. These and any other suitable methods for thus weakening the cover along appropriate lines I desire covered by this disclosure, the cardinal feature of the invention residing in the lineally extending weakened section, zone or area of a fabricated composition or other type of cover designed to be removed from the prepared adhesively appliable patching material for rubber goods.

In operation it is simply necessary to pass the patching material or the cover before application through the train of rolls under the pressure roll or other means for holding the goods against the abrading or other mutilating means operating to cut through approximately one-half of the protective fabric or other covering material. This operation, of course, less effectively, but using the same principles, can be performed with a simple hand tool which I consider an equivalent method and covered by my disclosure. This operation produces a line of diminished strength in the approximate center of the patch and makes easy the ripping or rupture of the covering when strain is exerted by either folding as in Figure 5 or by stress in opposite directions at right angles to the traversing mutilated line. Stretching of the yielding rubber materials tends to pull them away from the unyielding covering and makes it easy to grasp the edges of the ruptured fabric with the fingers and the stripping off of one portion of the covering leaves an exposed and chemically clean surface of the patch ready for application to the suitably prepared injured part of the rubber goods under repair. Then the other or remaining part of the covering likewise can be stripped off and the patch be allowed to fall in place when the usual stitching or rolling down process is done and the surface of the patch has not been impaired by contact with any body or substance likely to interfere with its firm adhesion.

It is believed the details and manner of use will be readily understood from the foregoing without further detailed explanation.

Having described the invention, what I claim is:

1. A patch for rubber articles comprising an adhesively coated elastic sheet and a temporary inelastic protective cover sheet adhesively attached to the elastic sheet, said cover sheet having a channel in its surface penetrating partly through the thickness of the cover sheet and retaining the remaining thickness in an imperforated state adapted to easy rupture and to release from adhesion by oppositely exerted strains subjected to the elastic sheet in directions at right angles to said channel.

2. A patch for rubber articles comprising an adhesively coated elastic sheet and a temporary inelastic protective cover sheet adhesively attached to the elastic sheet, said cover sheet having a score line in its surface of a depth less than the thickness of the cover sheet and retaining the remaining thickness in an imperforated state and adapted to easily rupture and to release from adhesion by oppositely exerted strains subjected to the elastic sheet in directions at right angles to said score line.

3. A patch for rubber articles comprising an adhesively coated elastic sheet and a temporary inelastic protective cover sheet adhesively attached to the elastic sheet, said cover sheet having a score line in its surface of a depth less than the thickness of the cover sheet and the remaining thickness of the cover sheet at the score line being imperforate, said score line extending to at least two edges of the cover sheet and adapted to easy rupture, and to release from adhesion by oppositely exerted strains subjected to the elastic sheet and to the cover sheet in directions at right angles to said score line, and to facilitate severing of the cover sheet along said score line.

4. A patch for rubber articles comprising an adhesively coated elastic sheet and a temporary inelastic protective cover sheet adhesively attached to the elastic sheet, said cover sheet being provided with a bodily weakened portion extending in a relatively thin line and penetrating partly through the thickness of the cover sheet, the remaining thickness of the cover sheet at said weakened portion being imperforate and reducing the tensile strength of the cover sheet to facilitate rupture and separation adhesively of the cover sheet along said weakened portion by an oppositely exerted force subjected to portions of the sheets in a direction at right angles to the weakened line.

5. A patch for rubber articles comprising an adhesively coated elastic sheet, a substantially air and light proof inelastic cover sheet adapted for temporarily adhesively attaching to the elastic sheet, said cover sheet having a bodily weakened portion extending partly through the thickness of the cover sheet, the remaining thickness of the cover sheet of said weakened portion being imperforate and reducing its tensile strength and extending across the covering from one edge thereof to another to facilitate severance and progressive zonal release of the adhesion of the cover sheet in directions leading from the weakened portion when portions of the sheet are subjected to an oppositely exerted force in directions at right angles to the weakened portion.

6. A patch for rubber articles comprising an adhesively coated elastic sheet and a temporary inelastic protective cover sheet adhesively attached to the elastic sheet, said cover sheet being constructed of fabric impregnated with a stiffening substance to increase the rigidity thereof and to substantially exclude air and light, and said cover sheet having a bodily weakened portion extending in a relatively thin line and penetrating partly through the thickness of the cover sheet, the remaining thickness of the cover sheet at said weakened portion being imperforate and rendered frangible when the patch is folded along the line of said weakened portion to sever the sheet at said line.

DELANO T. STARR.